United States Patent [19]

Hubbard et al.

[11] Patent Number: 4,674,167
[45] Date of Patent: Jun. 23, 1987

[54] METHOD OF CONVERTING A SINGLE CHAMBERED CONDUIT TO A MULTI-CHAMBERED CONDUIT

[75] Inventors: Charles E. Hubbard, Harper Woods; Donald E. Berkemeier, Bloomfield Hills, both of Mich.

[73] Assignee: Sterling Engineered Products Inc.

[21] Appl. No.: 844,193

[22] Filed: Mar. 26, 1986

Related U.S. Application Data

[60] Division of Ser. No. 758,408, Jul. 24, 1985, Pat. No. 4,585,034, which is a continuation-in-part of Ser. No. 557,841, Dec. 5, 1983, Pat. No. 4,582,093.

[51] Int. Cl.⁴ ............... B21K 21/16; B23P 17/04; B23P 23/00
[52] U.S. Cl. .................... 29/401.1; 29/433; 29/434; 29/455 R; 29/463
[58] Field of Search ............ 29/433, 455 R, 401.1, 29/463; 138/111, 115; 254/134.3 FT; 74/501 E; 174/95, 97; 350/96.23

[56] References Cited

U.S. PATENT DOCUMENTS

| | | | |
|---|---|---|---|
| 111,727 | 2/1871 | Conley | 138/115 |
| 273,869 | 3/1883 | McMahon | 138/115 X |
| 319,144 | 6/1885 | Stephens et al. | 29/401.1 X |
| 1,691,134 | 11/1928 | Schlaich | 29/433 UX |
| 1,851,559 | 3/1932 | Arey | 29/463 UX |
| 2,908,949 | 10/1959 | Frehse | 138/111 X |
| 3,529,632 | 9/1970 | Johns | 138/111 |
| 3,585,910 | 6/1971 | Brown | 138/115 UX |
| 4,112,708 | 9/1978 | Fukuda | 74/501 E X |
| 4,273,070 | 6/1981 | Hoefelmayr | 138/111 X |
| 4,411,409 | 10/1983 | Smith | 254/134.3 FT |

FOREIGN PATENT DOCUMENTS

| | | | |
|---|---|---|---|
| 1061856 | 7/1959 | Fed. Rep. of Germany | 174/95 |
| 773584 | 11/1934 | France | 138/111 |
| 17905 | 1/1982 | Japan | 350/96.23 |
| 3823 | of 1901 | United Kingdom | 138/115 |
| 1069623 | 5/1967 | United Kingdom | 29/433 |

Primary Examiner—Charlie T. Moon
Attorney, Agent, or Firm—Marshall & Melhorn

[57] ABSTRACT

The present invention relates to a method for utilizing a unique multi-chambered conduit insert for converting a single chambered conduit into a multi-chambered conduit. In particular, the conduit insert includes a plurality of cooperating longitudinally extending walls defining a plurality of parallel spaced apart coextensive chambers. The outer wall of each chamber which is adjacent the inner supporting surface of the single chambered conduit has a configuration wherein, if the outer wall contacts the inner conduit surface when the conduit insert is inserted within the conduit, such contact is line-to-line contact. This construction results in minimal contact of the insert with the interior wall of the existing conduit and enables the multi-chambered conduit insert to be fed into the existing conduit with the expenditure of minimal energy. In the method of the present invention, two individual conduit inserts are placed in back-to-back relationship to form an insert assembly which is subsequently inserted into the single chambered conduit.

1 Claim, 8 Drawing Figures

METHOD OF CONVERTING A SINGLE CHAMBERED CONDUIT TO A MULTI-CHAMBERED CONDUIT

CROSS-REFERENCE TO A RELATED APPLICATION

This is a division of application Ser. No. 758,408 filed July 24, 1985, now U.S. Pat. No. 4,585,034, which in turn is a continuation-in-part of application Ser. No. 557,841, filed Dec. 5, 1983, now U.S. Pat. No. 4,582,093.

BACKGROUND OF THE INVENTION

The present invention relates generally to a conduit assembly utilized to house a fiber optic cable and, in particular, to a method of utilizing a unique conduit insert to convert a single chambered conduit into a multi-chambered conduit capable of housing a plurality of fiber optic cables.

The use of telephonic communication is increasing throughout the world. In the past, as telephone use increased, additional electrically conductive cable was installed to accommodate the increased demand. In most metropolitan areas, cable used in the telephonic industry is typically placed in underground conduits. Generally, the underground conduit has an annular cross-section and is formed of a plastic material such a polyvinylchloride, for example. Such a plastic material provides the conduit with several advantages which include: (1) a high strength to weight ratio, (2) an effective environment for protecting the associated cable, and (3) a long life-cycle due to the inertness of the plastic material.

The increase in telephone use in certain highly populated areas has made it economical for the telephone companies to commence some significant and expensive changes in the mode of transmitting information telephonically. As mentioned above, the conventional medium used for conducting telephone messages has been cable formed of a plurality of individual electrically conductive wires. Many extraordinary developments have been made relating to increasing the efficiency of the telephone system by increasing the number of messages which can be conducted over a single wire. However, there are manifest limitations to the use of conventional, electrically conductive wires.

Recently, the telephone companies have had an additional option to consider when evaluating the parameters necessary to expand a given system to meet the increased demands. Fiber optics has presented an interesting possible option. Fiber optics can be successfully used for transmitting information by utilizing light energy, rather than electrical energy, as the conveyor of the information. Among the advantages of utilizing fiber optics is the increased rapidity in which information can be transmitted and the increased quanta of information which can be transmitted within a given cross-sectional area.

Therefore, at the point of time when the existing telephone cable network is at capacity and, in order to increase the capacity, the underground duct network would have to be replaced, fiber optics becomes a viable alternative. Since the physical characteristics of fiber optics are different from electrical cable, different handling and installation methods are required. For a number of reasons, it is considered beneficial to house fiber optic bundles in discrete housings rather than the conventional single chambered conduit used to house the previous electrically-conductive cable.

SUMMARY OF THE INVENTION

The present invention relates to a method for utilizing a unique multi-chambered conduit insert for converting a single chambered conduit into a multi-chambered conduit. In particular, the conduit insert includes a plurality of cooperating longitudinally extending walls defining a plurality of parallel spaced apart coextensive chambers. The outer wall of each chamber which is adjacent the inner supporting surface of the single chambered conduit has a configuration wherein, if the outer wall contacts the inner conduit surface when the conduit insert is inserted within the conduit, such contact is line-to-line contact. This construction results in minimal contact of the insert with the interior wall of the existing conduit and enables the multi-chambered conduit insert to be fed into the existing conduit with the expenditure of minimal energy. In the method of the present invention, two individual conduit inserts are placed in back-to-back relationship to form an insert assembly which is subsequently inserted into the single chambered conduit.

It is an object of the present invention to produce a conduit assembly having a plurality of discrete chambers for containing separate arrays or bundles of light energy transmitting glass fibers or strands which comprise a typical fiber optic information transmission system.

Another object of the invention is to produce a conduit for use in the converting of an existing single chamber conduit into a conduit having a plurality of discrete individual chambers.

Another object of the invention is to produce a multi-chambered conduit insert assembly which may be readily inserted into an existing single chamber conduit.

Another object of the invention is to produce a multi-chambered conduit insert assembly having a cross-sectional configuration causing only minimal contact with the interior wall of an existing conduit, thereby enabling the multi-chambered conduit insert assembly to be inserted within the existing conduit with the expenditure of minimal energy.

Another object of the invention is to produce a multi-chambered conduit insert assembly formed of at least two identical inserts disposed in back-to-back relation in use within a single chambered conduit.

BRIEF DESCRIPTION OF THE DRAWINGS

The above, as well as other objects and advantages of the invention, will become readily manifest to those skilled in the art from reading the following details description of a preferred embodiment of the invention when considered in the light of the accompanying drawings, in which.

DETAILED DESCRIPTION OF THE PREFERRED EMBODIMENT

Figure 1:
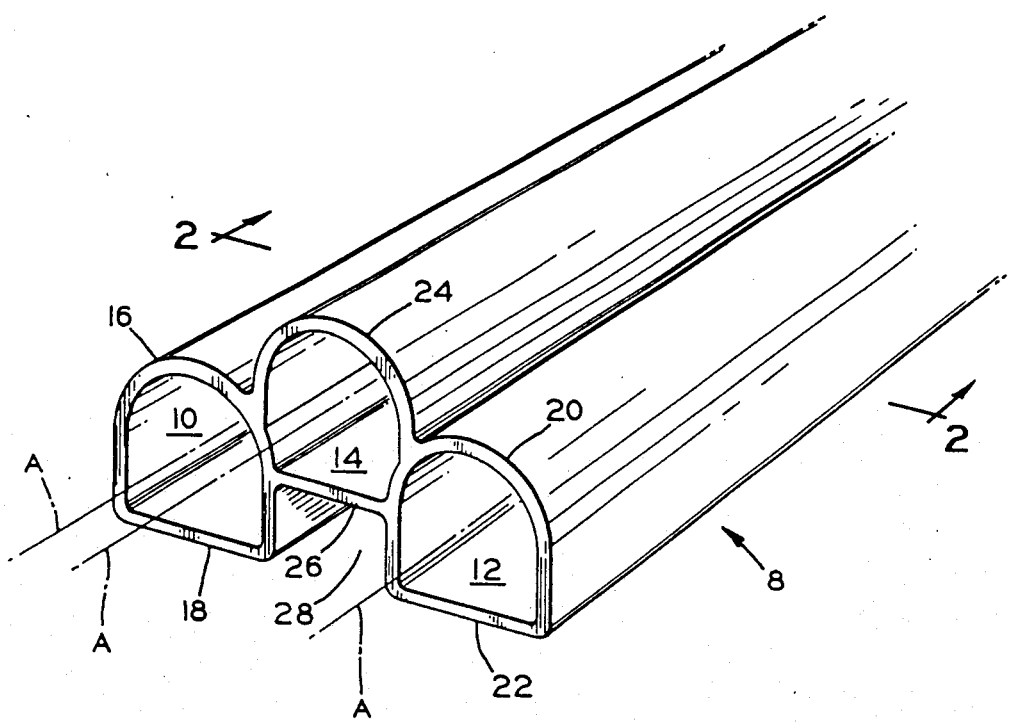
FIG. 1 is a perspective view of a multi-chambered conduit insert of one embodiment of the present invention.
Figure 2:
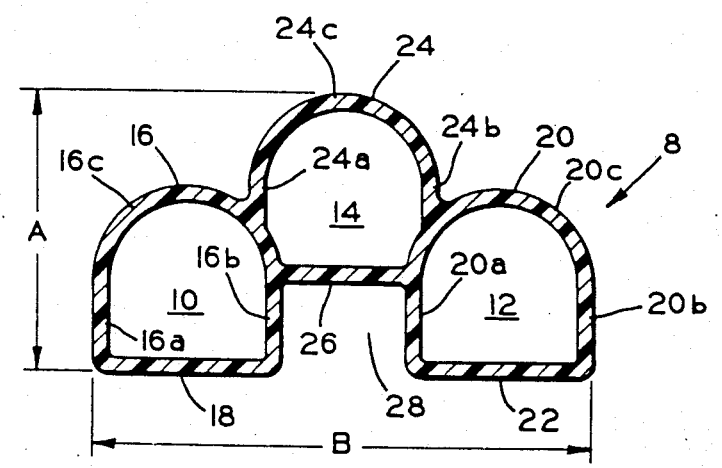
FIG. 2 is a cross-sectional view of the conduit insert illustrated in FIG. 1 and taken along line 2—2 thereof.

FIGS. 1 and 2 illustrate a conduit insert 8 which represents one embodiment of the present invention and includes a pair of spaced apart longitudinally extending chambers 10 and 12. The chamber 10 is defined by an arched-shaped outer wall 16 and a bottom or base wall 18 extending between the ends of the arched wall 16. Similarly, the chamber 12 is defined by an arched-shaped outer wall 20 and a bottom or base wall 22 extending between the ends of the arched wall 20.

An intermediate chamber 14 is disposed between and integral with the chambers 10 and 12. The chamber 14 is defined by an arched outer wall 24 of a configuration similar to the outer walls 16 and 20 defining the chamber 10 and 12, respectively. The lower ends of the outer wall 24 merge with the outer walls 16 and 20, respectively. The bottom or base of the chamber 14 is defined by a laterally extending wall 26. The wall 26 cooperates with the facing portions of the wall 16 and 20 to form an open channel 28 having a cross-sectional configuration of an inverted U. Each of the chambers 10, 12, and 14 has a longitudinal axis A which is an imaginary line extending centrally of the chambers along the entire lengths thereof. Also, it will be noted that each of the chambers 10, 12, and 14 is of the same length and, therefore, the chambers may be described as being coextensive with each other. The word "coextensive", as used throughout the description, simply means of equal length.

The arched wall 16 defining the chamber 10 includes first and second generally parallel side walls 16a and 16b joined at one of the respective edges thereof by a third wall 16c, and joined at the opposite edges thereof by the base wall 18. Also, the arched wall 20 defining the chamber 12 includes first and second generally parallel side walls 20a and 20b joined at one of the respective edges thereof by a third wall 20c, and joined at the opposite edges thereof by the base wall 22. Similarly, the arched wall 24 defining the intermediate chamber 14 includes first and second generally parallel side walls 24a and 24b joined at one of the respective edges thereof by a third wall 24c and joined at the opposite edges thereof by the base wall 26.

The structure illustrated in FIGS. 1 and 2 may be fabricated of a plastic material in continuous lengths by the known plastic extrusion processes. Satisfactory results may be achieved by utilizing a self-lubricating plastic material such as an olefin, for example. Low density polyethylene, a member of the olefin family, has been found to exhibit excellent results. The nature of the plastic material imparts to the finished product appropriate physical strength and inertness to moisture. Since the product can be formed in continuous lengths, the individual chambers of the formed product are capable of housing bundles of strands of fiber optic material in a discrete and protected state.

Typically, the inserts embodying the inventive features are employed for converting existing single chambered ducts into a multi-chambered duct. In such installations, the portion of the outer wall of each of the chamber which is adjacent the inner wall of the conduit is caused to contact the outer duct in only line-to-line contact with the inner wall surface of the duct being retrofitted as will become clearly manifest hereinafter. When the nominal outside diameter of the single chambered conduit is approximately four inches, the typical cross-sectional dimensions of the insert member include a 0.08 inch wall thickness; the arcs of the arched walls 16, 20, 24 of the chamber 10, 12, 14, respectively, are struck on a 0.5 inch radius; the height dimension A (FIG. 2) is 1.725 inches; and the width of dimension B (FIG. 2) is 3.17 inches.

Figure 3:
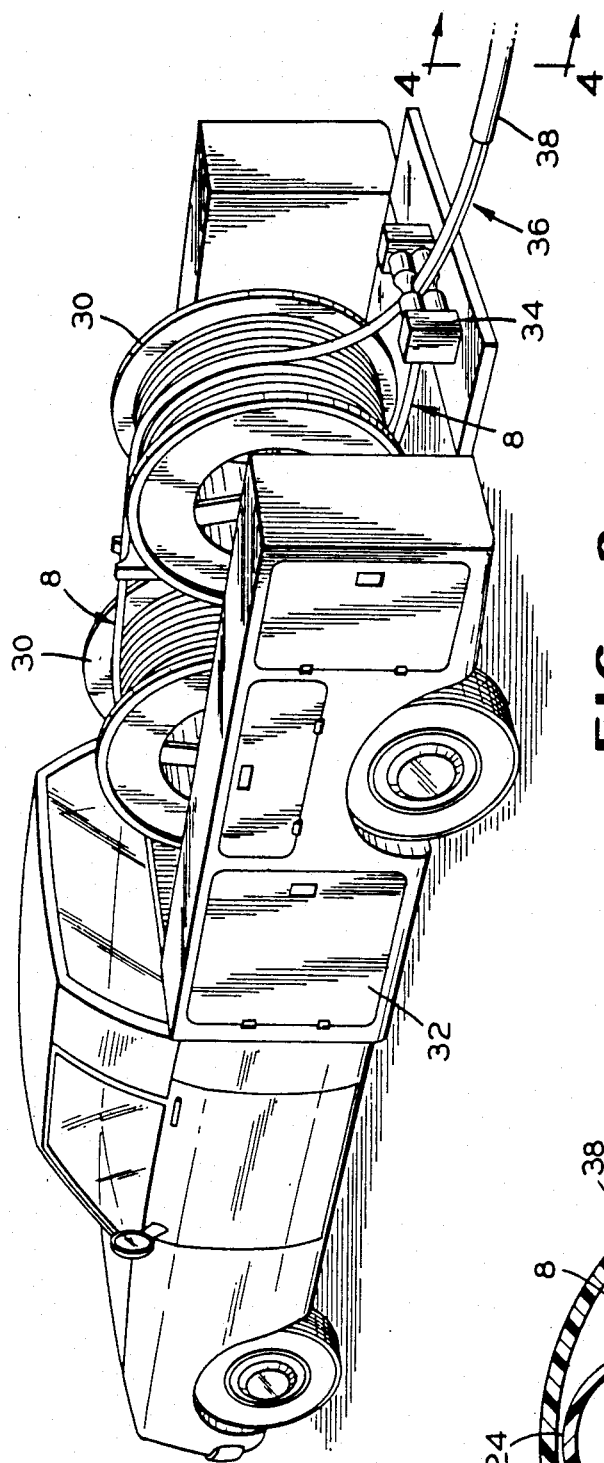
FIG. 3 is a perspective view of typical installation equipment for the conduit insert illustrated in FIGS. 1 and 2.

With the above described example, the extruded conduit inserts 8 of the invention may be coiled on separate reels 30 as illustrated in FIG. 3, at the point of manufacture. The coiled product on the reels 30 may be transported to a job site on a vehicle of the type illustrated in FIG. 3.

Figure 4:
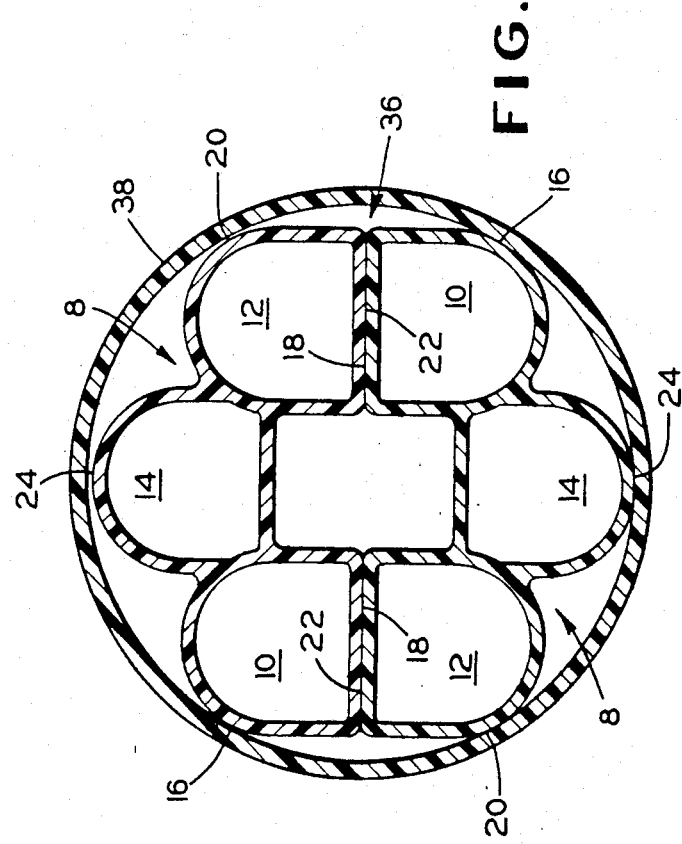
FIG. 4 is a sectional view illustrating two of the conduit inserts of FIG. 1 inserted into an existing duct in back-to-back relationship.

The transporting vehicle 32 typically includes a mounting mechanism rotatably supporting at least two reels 30 and a suitable drive mechanism 34 for effecting a paying off of lengths of the individual conduit inserts in a back-to-back relationship as illustrated in FIG. 3. The inherent cross-sectional configuration of the individual inserts enables a single composite insert assembly 36 to be formed, as illustrated in FIG. 4, wherein the base wall 18 of the uppermost insert is juxtaposed to the base wall 22 of the lowermost insert. It will be appreciated that the composite insert assembly 36 contains six (6) individual discrete chambers for housing separate bundles of fiber optic cables.

The typical installation procedure utilizes a pulling clamp or halter arrangement secured to the leading end of the assembly 36 to be inserted. Thence the insert assembly 36 is pulled through a single chamber, duct 38 by a suitable winch cable arrangement. In FIG. 4, it will be noted that, when the insert assembly contacts the inner wall of the duct 38, such contact is usually between the curved outer surface portions of the lower insert 8 and the adjacent inner surface of the duct 38. More specifically, the contact between the inner wall of the duct 38 is effected at a point on the curved surfaces of the outer walls 16, 20, 24 which define the chambers 10, 12, 14, respectively. Thus, when the insert assembly 36 is inserted within the duct 38, if one of the curved outer surface portions of the lower insert contacts the inner annular supporting surface of the duct 38, such contact will be line-to-line contact. Such contact assures a stable locating of the composite insert assembly 36 within the interior of the duct 38 and provides minimal surface-to-surface contact between the insert assembly 36 and the duct 38, thereby maintaining a low coefficient of friction between the composite insert assembly 36 and the duct 38 to facilitate the insertion or removal of the insert assembly 36 into or out of the associated duct 38.

Figure 5:
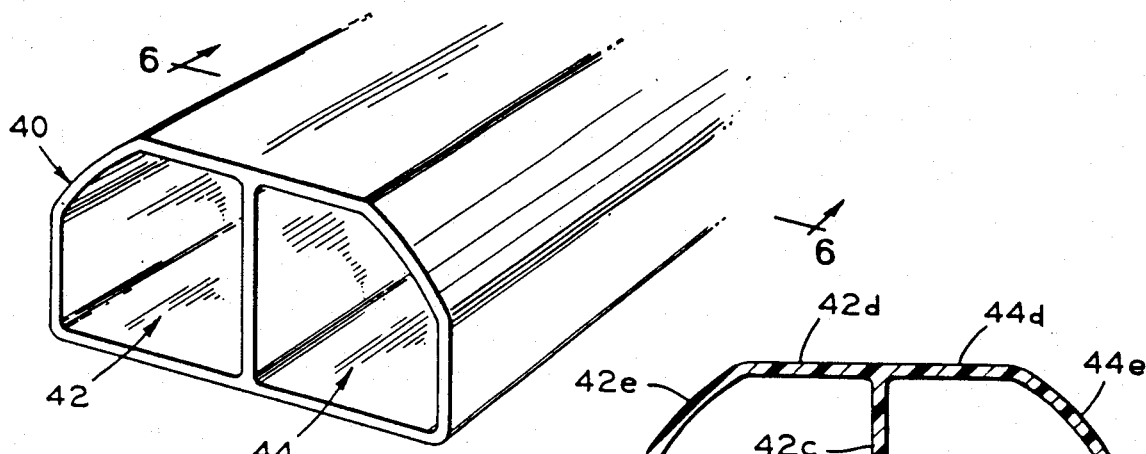
FIG. 5 is a perspective view of an alternate embodiment of a conduit insert having the features of the present invention.
Figure 6:
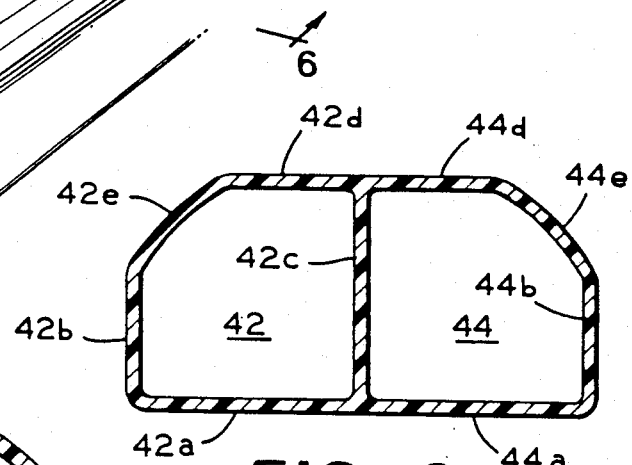
FIG. 6 is a cross-sectional view of the conduit insert illustrated in FIG. 5 and taken along the line 6—6 thereof.

Referring to FIGS. 5 and 6, there is shown an alternate embodiment of a conduit insert 40 which includes two longitudinally extending chambers 42 and 44. The chamber 40 is defined by a flat base wall 42a, an outer side wall 42b, an inner side wall 42c which is common with the chamber 44, a flat top wall 42d, and a curved wall portion 42e connecting the outer side wall 42b to the top wall 42d. The chamber 44 is defined by a flat base wall 44a which is integral with and coplanar with the base wall 42a, an outer side wall 44b, the common inner side wall 42c, a flat top wall 44d which is integral with and coplanar with the top wall 42d, and a curved wall portion 44e connecting the top wall 44d to the outer side wall 44b.

Figure 7:
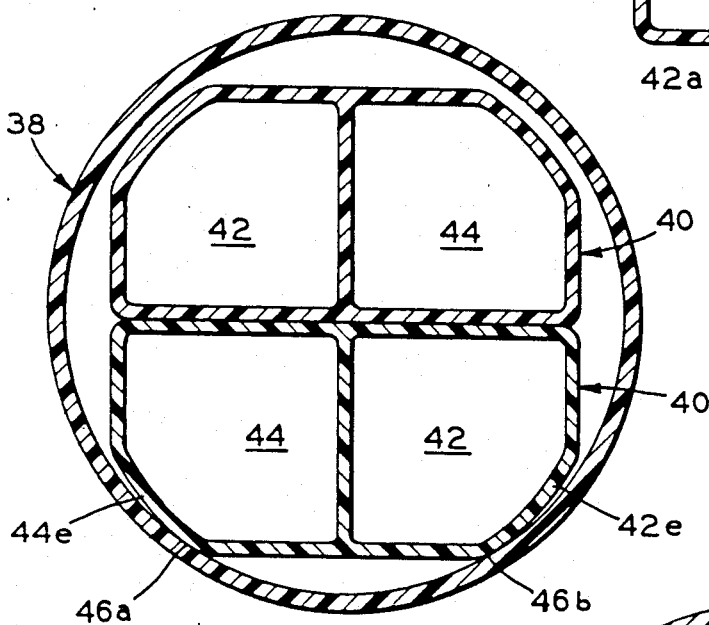
FIG. 7 is a sectional view of two of the conduit inserts of FIG. 5 positioned in back-to-back relationship within an existing duct.
Figure 8:
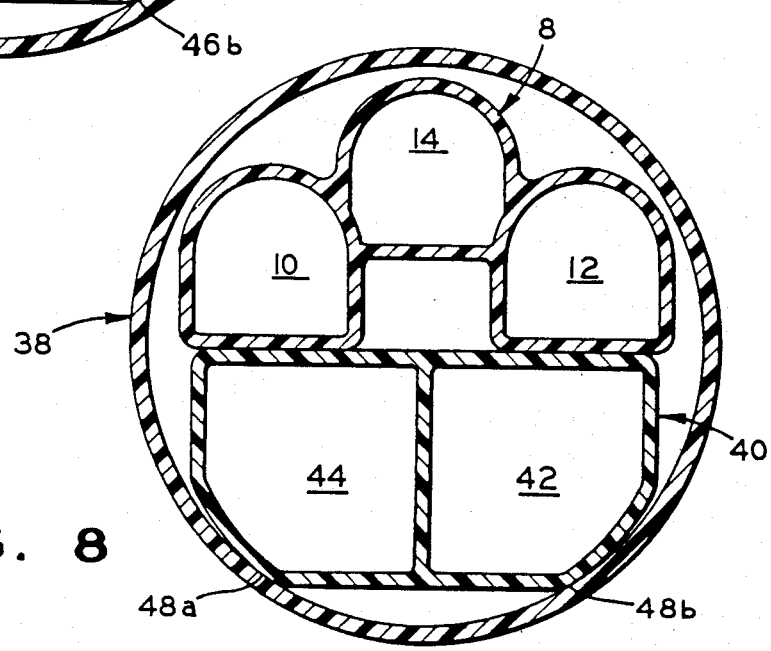
FIG. 8 is a sectional view of the conduit inserts of FIGS. 1 and 5 positioned in back-to-back relationship within an existing duct.

Referring to FIGS. 7 and 8, the conduit insert 40 of FIG. 5 can be inserted into the single chambered conduit 38 in a manner as described above. In FIG. 7, two individual conduit inserts 40 of the type shown in FIG. 5 are positioned in back-to-back relationship within the conduit 38. The radius of the outer surface of the curved wall portions 42e and 44e is different from the radius of the inner wall of the conduit 38 such that contact between the wall portions 42e and 44e of the lower insert and the inner surface of the conduit 38 is line-to-line contact at points 46a and 46b. In FIG. 8, the conduit insert 8 of FIG. 1 is positioned within the conduit 38 in back-to-back relationship with the conduit insert 40 of FIG. 5, with line-to-line contact occurring at points 48a and 48b.

While in the preferred embodiment of the invention shown in the drawings, the individual insert sections are adapted to be maintained in the desired position within the duct by means of the inner wall of the duct, it will be appreciated that means can be provided for attaching the two individual insert sections to one another prior to inserting the sections within the conduit. For example, the wall 18 of the insert section shown in FIG. 2 can be provided with a downwardly depending and longitudinally extending lock lug portion (not shown) which can be inserted into a cooperating locking lug receiving groove formed in adjacent outer wall portions of the cooperating lower insert section (not shown). Similarly, the outer wall 22 and the adjacent wall of the cooperating lower insert section can be provided with a similar locking device. In these instances, the space between the two locking means can provide an additional chamber.

Also, while not shown in the drawings, it may be desirable in some instances to provide a means for identifying the individual chambers. For example, an identification means such as one or more longitudinally extending ribs, for example, can be molded into the outer wall portion of each chamber to enable each chamber to be individually identified at any point along the entire length of the insert.

In accordance with the provisions of the patent statutes, the principles and mode of operation of the present invention have been illustrated and described in what is considered to represent its preferred embodiment. However, it should be understood that the invention may be practiced otherwise than as specifically illustrated and described without departing from the scope of the attached claims.

What is claimed is:

1. A method of converting a single chambered conduit to a multi-chambered conduit comprising the steps of:
   (a) positioning a first and second insert section each including a plurality of longitudinally extending walls defining a plurality of individual coextensive chambers in back-to-back relationship to define an insert assembly;
   (b) positioning the one end of the insert assembly into an internal longitudinally extending passageway of a single chambered conduit, the portion of the outer wall of each of the chambers which is adjacent the inner supporting surface of the internal passageway of the conduit having a configuration wherein if such wall portion contacts the inner supporting surface, such contact is singular line contact; and
   (c) feeding the desired length of the insert assembly into the single chambered assembly to produce a multi-chambered conduit.

* * * * *